United States Patent
Terwilliger et al.

(10) Patent No.: US 12,006,866 B2
(45) Date of Patent: Jun. 11, 2024

(54) HYBRID ELECTRIC HYDROGEN ENGINE FOR AIRCRAFT

(71) Applicant: RTX Corporation, Farmington, CT (US)

(72) Inventors: Neil J. Terwilliger, Cheshire, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/860,730

(22) Filed: Jul. 8, 2022

(65) Prior Publication Data

US 2024/0011436 A1 Jan. 11, 2024

(51) Int. Cl.
*F02C 6/00* (2006.01)
*B64D 27/10* (2006.01)
(Continued)

(52) U.S. Cl.
CPC ............ *F02C 6/00* (2013.01); *B64D 27/10* (2013.01); *B64D 27/24* (2013.01); *B64D 33/08* (2013.01);
(Continued)

(58) Field of Classification Search
CPC ...... F02C 6/00; F02C 6/18; F02C 7/12; F02C 9/26; B64D 2027/026; B64D 27/10;
(Continued)

(56) References Cited

U.S. PATENT DOCUMENTS 10,774,741 B2   9/2020   Sennoun
10,800,525 B2  10/2020   Sankrithi et al.
(Continued)

FOREIGN PATENT DOCUMENTS

CN   108847497 A   * 11/2018   ........ H01M 8/04007
JP   2009187755 A    8/2009

OTHER PUBLICATIONS

Bradley Marty; "Identification and Descriptions of Fuel Cell Architectures for Aircraft Applications"; 2022 IEEE; Transportation Electrification Conference & Expo (ITEC); Jun. 15, 2022; pp. 1047-1050.
(Continued)

*Primary Examiner* — Loren C Edwards
(74) *Attorney, Agent, or Firm* — CANTOR COLBURN LLP (57) ABSTRACT

Turbine engine systems include a core assembly having a compressor section, a burner section, and a turbine section arranged along a shaft, with a core flow path through the turbine engine such that exhaust from the burner section passes through the turbine section and exits through a nozzle. A core condenser is arranged downstream of the turbine section and upstream of the nozzle and configured to condense water from the core flow path. A fuel cell is operably connected to the core assembly. A fuel source is configured to supply a fuel to each of the burner section for combustion and the fuel cell for reaction to generate electricity. At least one electric motor is operably coupled to the core assembly and configured to impart power to a portion of the core assembly and the fuel cell is configured to supply electrical power to the at least one electric motor.

19 Claims, 7 Drawing Sheets

(51) Int. Cl.
  *B64D 27/24* (2006.01)
  *B64D 33/08* (2006.01)
  *F02C 7/12* (2006.01)
  *F02C 9/26* (2006.01)
  *H01M 8/04007* (2016.01)
  *B64D 27/02* (2006.01)

(52) U.S. Cl.
  CPC .................. *F02C 7/12* (2013.01); *F02C 9/26* (2013.01); *H01M 8/04059* (2013.01); *B64D 27/026* (2024.01); *H01M 2250/20* (2013.01)

(58) Field of Classification Search
  CPC .. B64D 27/24; B64D 33/08; B64D 2041/005; H01M 8/04059; H01M 2250/20; F05D 2260/205; F05D 2260/212; F05D 2260/213; F05D 2220/76; Y02T 50/60; Y02T 90/40; F02K 3/00–3/12
  See application file for complete search history.

(56) References Cited

U.S. PATENT DOCUMENTS

| | | |
|---|---|---|
| 2005/0019620 A1 | 1/2005 | Schick et al. |
| 2008/0072577 A1 | 3/2008 | Taylor et al. |
| 2017/0211474 A1* | 7/2017 | Sennoun ............. H01M 8/0618 |
| 2021/0207500 A1* | 7/2021 | Klingels ................. F01K 23/10 |
| 2021/0207540 A1 | 7/2021 | Roberge |
| 2023/0258548 A1* | 8/2023 | Wang ..................... G01N 33/24 73/64.51 |

OTHER PUBLICATIONS

EP Search Report; EP Application No. 23184227.9; dated Nov. 17, 2023, 18 pages.

* cited by examiner

HYBRID ELECTRIC HYDROGEN ENGINE FOR AIRCRAFT

TECHNICAL FIELD

The present disclosure relates generally to turbine engines and aircraft engines, and more specifically to hybrid electric, hydrogen aircraft engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, a liquid-based fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, turbine engine systems are provided. The turbine engine systems include a core assembly comprising a compressor section, a burner section, and a turbine section arranged along a shaft, with a core flow path through the turbine engine such that exhaust from the burner section passes through the turbine section and exits through a nozzle; a core condenser arranged downstream of the turbine section of the core assembly along the core flow path and upstream of the nozzle, the core condenser configured to condense water from the core flow path; a fuel cell operably connected to the core assembly; a fuel source configured to supply a fuel to each of the burner section for combustion and the fuel cell for reaction to generate electricity; and at least one electric motor operably coupled to the core assembly and configured to impart power to a portion of the core assembly, wherein the fuel cell is configured to supply electrical power to the at least one electric motor.

In addition to one or more of the features described above, or as an alternative, embodiments of the turbine engine systems may include that water from the core condenser is directed through a cooling element of the fuel cell to provide cooling thereto.

In addition to one or more of the features described above, or as an alternative, embodiments of the turbine engine systems may include that the cooling element is a cold plate thermally coupled to the fuel cell.

In addition to one or more of the features described above, or as an alternative, embodiments of the turbine engine systems may include that the fuel cell is thermally coupled to the core condenser.

In addition to one or more of the features described above, or as an alternative, embodiments of the turbine engine systems may include that the thermal coupling of the fuel cell to the core condenser comprises one of: mounting at least a portion of the fuel cell to the core condenser; a closed-loop cooling cycle thermally connecting the fuel cell to the core condenser; or directing water from the collected water through the core condenser and into a cooling element of the fuel cell.

In addition to one or more of the features described above, or as an alternative, embodiments of the turbine engine systems may include that compressed air is directed from the compressor section to the fuel cell to provide at least one of air cooling or reactant air to the fuel cell.

In addition to one or more of the features described above, or as an alternative, embodiments of the turbine engine systems may include that the at least one electric motor is operably coupled to at least one of the compressor section or a shaft of the core assembly to provide power thereto.

In addition to one or more of the features described above, or as an alternative, embodiments of the turbine engine systems may include a fan section at an inlet of the core assembly.

In addition to one or more of the features described above, or as an alternative, embodiments of the turbine engine systems may include that the at least one electric motor is operably coupled to the fan section to provide power thereto.

In addition to one or more of the features described above, or as an alternative, embodiments of the turbine engine systems may include that each of the core condenser and the fuel cell are configured to output water to be injected into the core flow path.

In addition to one or more of the features described above, or as an alternative, embodiments of the turbine engine systems may include a water tank configured to receive the output water from the core condenser and the fuel cell.

In addition to one or more of the features described above, or as an alternative, embodiments of the turbine engine systems may include a core flow evaporator arranged downstream from the turbine section and upstream from the core condenser along the core flow path, the core flow evaporator configured to generate steam from water output from at least one of the core condenser and the fuel cell.

In addition to one or more of the features described above, or as an alternative, embodiments of the turbine engine systems may include a controller configured to control operation of at least the fuel cell, the controller configured to operate the fuel cell when the core assembly is in an idle mode of operation.

According to some embodiments, methods of operating turbine engine systems are provided. The turbine engine systems include a core assembly and a fuel cell. The methods include supplying a fuel from a fuel source to a burner of the core assembly and to the fuel cell; extracting water from a core flow of the core assembly using a core condenser arranged downstream from the burner in a direction of the core flow; collecting water from at least one of the core condenser or the fuel cell; injecting at least a portion of the collected water into the core flow at at least one of a compressor section, the burner, or a turbine section of the core assembly; and thermally coupling the fuel cell to the core condenser to provide cooling to the fuel cell.

In addition to one or more of the features described above, or as an alternative, embodiments of the methods may include that the thermal coupling of the fuel cell to the core condenser comprises directing water from the collected water through the core condenser and into a cooling element of the fuel cell.

In addition to one or more of the features described above, or as an alternative, embodiments of the methods may include that the thermal coupling of the fuel cell to the core condenser comprises mounting at least a portion of the fuel cell to the core condenser.

In addition to one or more of the features described above, or as an alternative, embodiments of the methods may include that the thermal coupling of the fuel cell to the core condenser comprises a closed-loop cooling cycle thermally connecting the fuel cell to the core condenser.

In addition to one or more of the features described above, or as an alternative, embodiments of the methods may include generating steam from the collected water prior to injection into the core flow.

In addition to one or more of the features described above, or as an alternative, embodiments of the methods may include generating 50% or greater of the collected water from the core flow passing through the core condenser during a high power operation of the core assembly, wherein the high power operation is defined as an operational mode where the core assembly is operated at 50% of maximum corrected thrust or greater; and generating 50% or greater of the collected water from the fuel cell during a low power operation of the core assembly, wherein the low power operation is defined as an operational mode where the core assembly is operated at less than 50% of maximum corrected thrust.

In addition to one or more of the features described above, or as an alternative, embodiments of the methods may include generating 50% or greater of the collected water from the core flow passing through the core condenser in response to a high throttle lever angle, wherein the high throttle lever angle is defined as a position of a throttle of an aircraft being positioned at 50% or greater of a full span of throttle movement; and generating 50% or greater of the collected water from the fuel cell response to a low throttle lever angle, wherein the low throttle lever angle is defined as a position of a throttle of an aircraft being positioned at below 50% of a full span of throttle movement.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
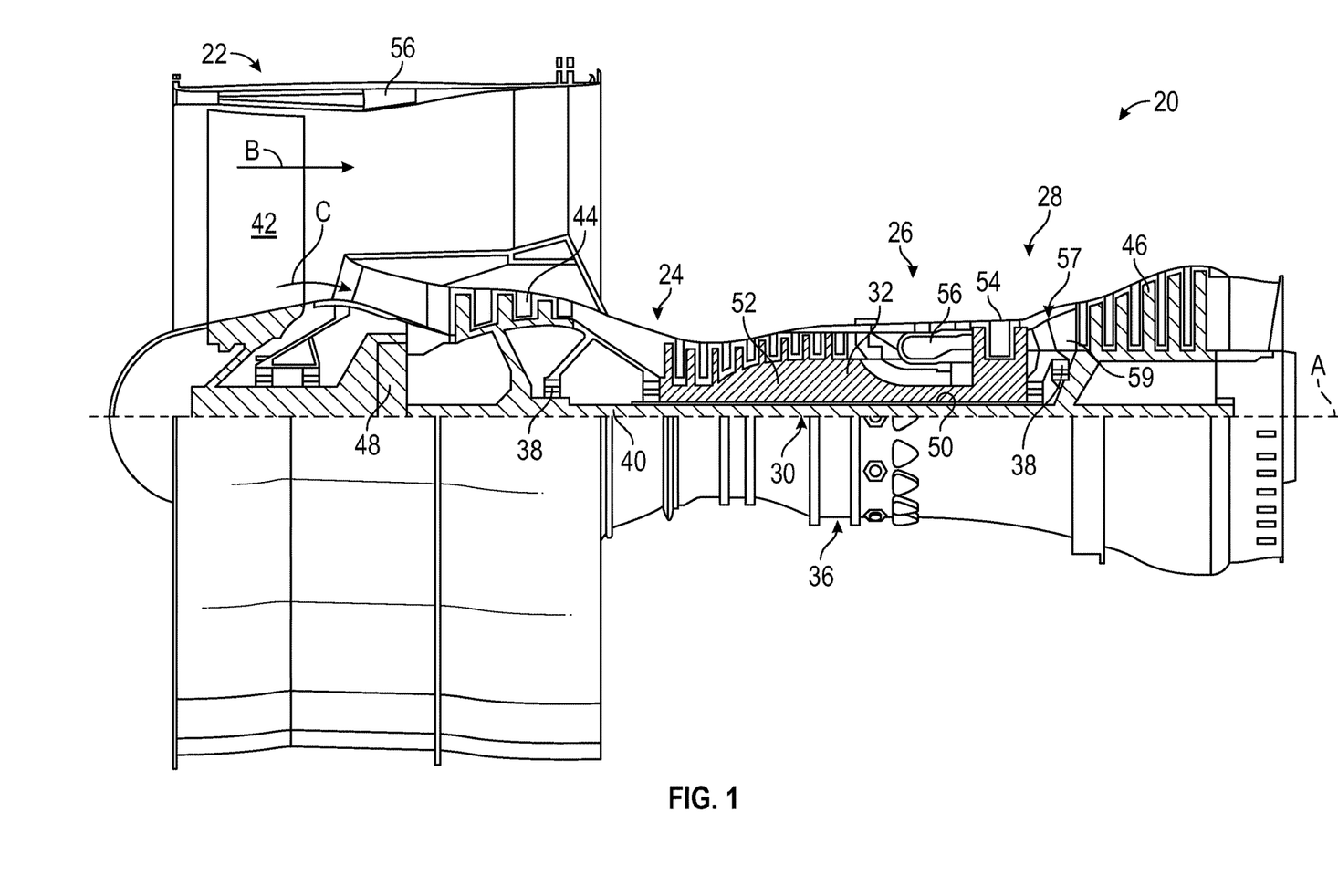
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a cold stream flow path B in a bypass duct defined in a fan case 23. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy and can be a large source of inefficiency in gas turbine engines. Further, transitioning away from hydrocarbon-based engines may be significant advantages, as described herein.

Figure 2:
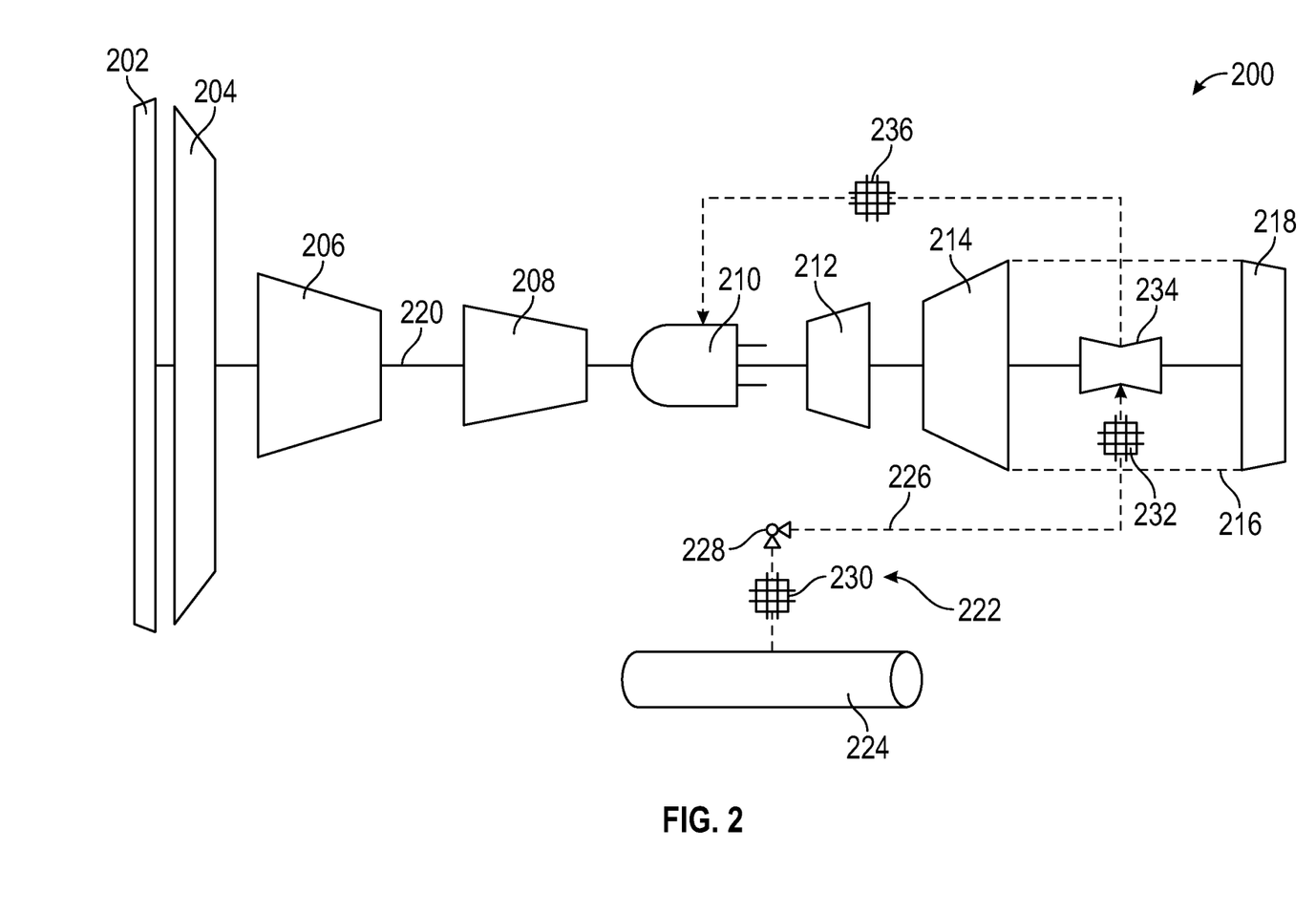
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above but is configured to employ a non-hydrocarbon fuel source, such as a cryogenic fuel, including but not limited to hydrogen. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206,208, the turbine 212, 214, and the combustor sections 210. The compressor 206, 208, the turbine 212, 214, and the fan 204 are arranged along a shaft 220.

As shown, the turbine engine system 200 includes a cryogenic fuel system 222. The cryogenic fuel system 222 is configured to supply a cryogenic fuel from a cryogenic fuel tank 224 to the combustor 210 for combustion thereof. In this illustrative embodiment, the cryogenic fuel may be supplied from the cryogenic fuel tank 224 to the combustor 210 through a fuel supply line 226. The fuel supply line 226 may be controlled by a flow controller 228 (e.g., pump(s), valve(s), or the like). The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc.

As shown, between the cryogenic fuel tank 224 and the flow controller 228 may be one or more heat exchangers 230, which can be configured to provide cooling to various systems onboard an aircraft by using the cryogenic fuel (e.g., liquid hydrogen) as a cold-sink. Such hydrogen heat exchangers 230 may be configured to warm the hydrogen and aid in a transition from a liquid state to a supercritical fluid or gaseous state for combustion within the combustor 210. The heat exchangers 230 may receive the hydrogen fuel directly from the cryogenic fuel tank 224 as a first working fluid and a component-working fluid for a different onboard system. For example, the heat exchanger 230 may be configured to provide cooling to power electronics of the turbine engine system 200 (or other aircraft power electronics). In other embodiments, the arrangement of the heat exchanger 230 and the flow controller 228 (or a flow controller element, such as a pump) may be reversed. In some such embodiments, a pump, or other means to increase a pressure of the hydrogen sourced from the cryogenic fuel tank 224, may be arranged upstream of the heat exchanger 230. This pumping or pressure increase may be provided to pump the hydrogen to high pressure as a liquid (low power). It will be appreciated that other configurations and arrangements are possible without departing from the scope of the present disclosure.

In some non-limiting embodiments, an optional secondary fluid circuit may be provided for cooling one or more aircraft loads. In this secondary fluid circuit, a secondary fluid may be configured to deliver heat from the one or more aircraft loads to one or more liquid hydrogen heat exchanger. As such, heating of the hydrogen and cooling of the secondary fluid may be achieved. The above described configurations and variations thereof may serve to begin raising a temperature of the hydrogen fuel to a desired temperature for efficient combustion in the combustor 210.

The hydrogen may then pass through an optional supplemental heating heat exchanger 236. The supplemental heating heat exchanger 236 may be configured to receive hydrogen as a first working fluid and, as the second working fluid provided via the optional secondary fluid circuit, may receive one or more aircraft system fluids, such as, without limitation, engine oil, environmental control system fluids, pneumatic off-takes, or cooled cooling air fluids. As such, the hydrogen will be heated, and the other fluid may be cooled. The hydrogen will then be injected into the combustor 210 through one or more hydrogen injectors, as will be appreciated by those of skill in the art.

When the hydrogen is directed along the flow supply line 226, the hydrogen can pass through a core flow path heat exchanger 232 (e.g., an exhaust waste heat recovery heat exchanger) or other type of heat exchanger. In this embodiment, the core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the hydrogen passes through the core flow path heat exchanger 232, the hydrogen will pick up heat from the exhaust of the turbine engine system 200. As such, the temperature of the hydrogen will be increased.

The heated hydrogen may then be passed into an expansion turbine 234. As the hydrogen passes through the expansion turbine 234 the hydrogen will be expanded. The process of passing the hydrogen through the expansion turbine 234 cools the hydrogen and extracts useful power through the expansion process. Because the hydrogen is heated from a cryogenic or liquid state in the cryogenic fuel tank 224 through the various mechanisms along the flow supply line 226, engine thermals may be improved.

The use of hydrogen fuel in a gas turbine engine (e.g., in combustion) causes the generation of water. In such systems, steam capture may provide benefits, but condenser pressure loss may be prohibitive to capitalize on capturing steam from the exhaust. Further, hydrogen engine concepts involving exhaust steam capture may experience challenges at idle, where water may be difficult to extract from exhaust gases. The challenge at idle may result from low fuel burning and from an off-design, inefficient cycle, resulting in relative high exhaust temperatures while partial pressure of water is low, causing difficulty in condensing liquid water from an exhaust stream. Certain component designs for combustors and evaporators may benefit from being able to rely on steam or water availability, as a supply of liquid water cools the evaporator material and a supply of steam can be relied on to cool parts of a combustor or burner.

In view of this and other considerations, embodiments of the present disclosure are directed to incorporating a fuel cell into a hydrogen burning engine system that can be utilized in concert with the hydrogen burning gas turbine engine to mitigate these issues and provide other benefits in terms of efficiency, operational envelopes, reduced engine drag, weight benefits, and the like. Further, in accordance with some embodiments of the present disclosure, cooling requirements of a fuel cell can be met by dual-purposing heat exchangers of the hydrogen engine, thus providing improved efficiencies, reduction in component parts, reduction in system complexity, and the like.

Figure 3:
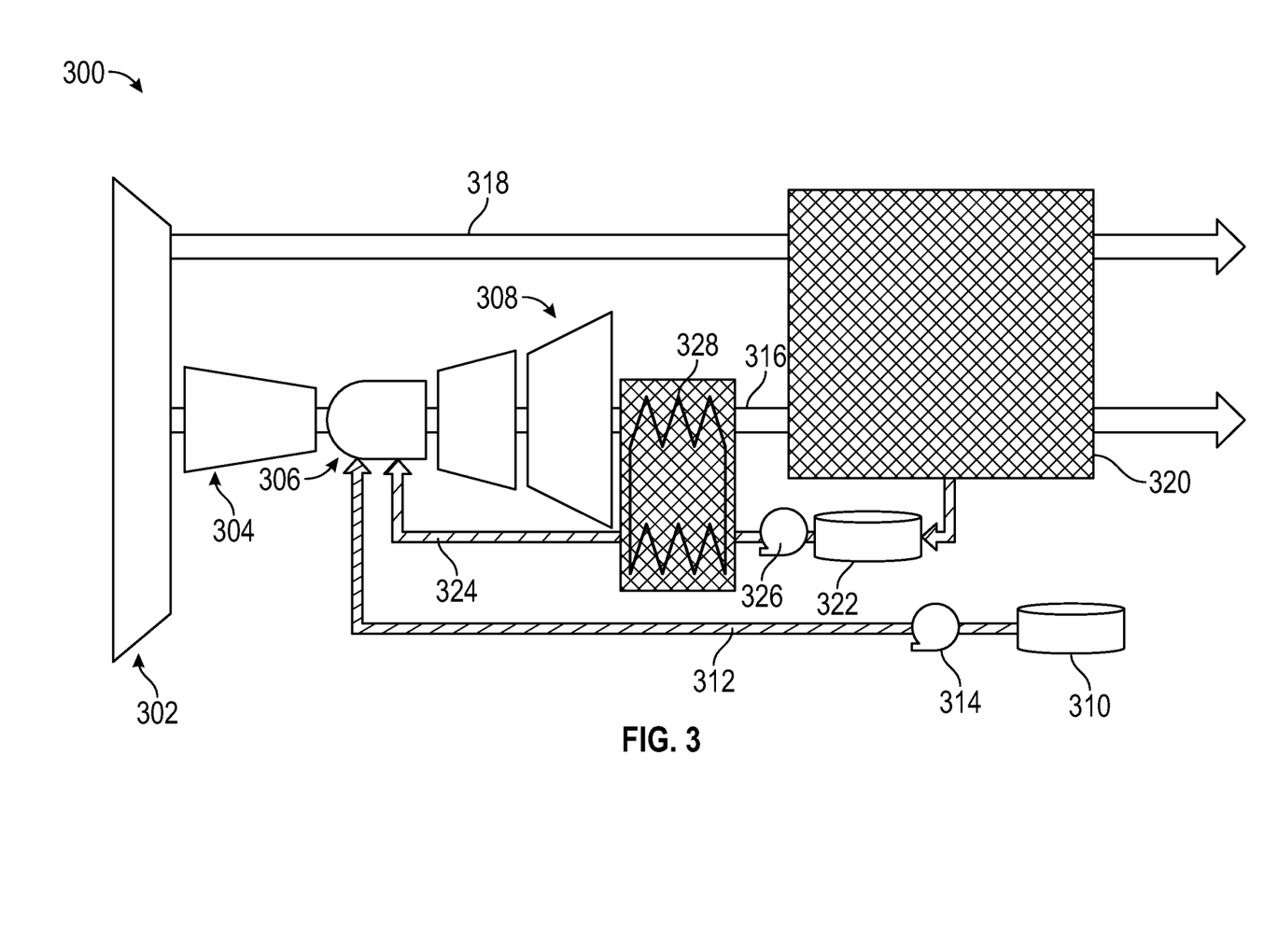
FIG. 3 is a schematic diagram of a turbine engine that may incorporate embodiments of the present disclosure.

Referring now to FIG. 3, a schematic diagram of a hydrogen combustion engine 300 that can incorporate embodiments of the present disclosure is shown. The hydrogen combustion engine 300 includes a fan section 302, a compressor section 304, a burner section 306, and a turbine section 308. The compressor section 304, the burner section 306, and the turbine section 308 define a Brayton cycle of the engine 300. The burner section 306 includes a combustion chamber configured to mix and burn a fuel, such as hydrogen, the combustion of which generates gaseous water as a byproduct of the combustion operation. The hydrogen fuel is sourced from a cryogenic fuel tank 310. The cryogenic fuel tank 310 is employed to store the hydrogen fuel at cryogenic temperatures in order to reduce the size of the fuel tank. The fuel may be stored as a liquid within the cryogenic fuel tank 310 and converted to a supercritical or gaseous state prior to injection into the burner section 306. The fuel is passed through a fuel line 312 by operation of a pump 314 or the like. The fuel may be passed through various heat exchangers, pumps, or the like (not shown) along the fuel line 312. Such components may be used to alter a temperature and/or pressure of the fuel prior to injection into the burner for combustion.

As shown, a core flow path 316 passes through the engine 300. The core flow path 316 has an inlet at the fan section 302, is compressed within the compressor section 304, mixed with fuel and combusted within the burner section 306, and the hot exhaust from the burner section 306 is passed through the turbine section 308 to extract work therefrom (e.g., drive rotation of an engine shaft). The hot exhaust that is expanded through the turbine section 308 is then directed downstream and exits through an exhaust nozzle (not shown). A second flow of air in the engine 300 bypasses the main core components of the engine 300 through a cold stream flow path 318 (e.g., a bypass flow that bypasses the Brayton cycle of the engine 300 as illustratively shown or a ram flow path, for example). The temperature of the air in the cold stream flow path 318 may be relatively cooler than the core flow, particularly downstream from the burner section 306 (e.g., about 120° F. in the cold stream flow path 318 and about 120-400° F. in the core flow path 316—thus resulting in the delta temperature).

Efficiency of the engine 300 may be improved through water capture from the core flow path 316 which is present as result of the combustion of the hydrogen within with the burner section 306. This captured water may be reinjected into the core flow path as steam to improve efficiency of the combustion operation within the burner section 306. The efficiency improvement may also be driven by increased energy extraction in the turbines due to the presence of water. There may also be improvement due to steam injection that operates as a recuperator (i.e., recovers waste heat and puts it back in at the combustor). It will be appreciated that such captured water may be injected into other locations along the core flow path 316 (e.g., at the compressor section 304 and/or the turbine section 308). A core condenser 320 is arranged downstream along the core flow path 316 from the combustor section 306 to provide water extraction through condensation. In this configuration, a cold sink of the core condenser 320 is provided by the air within the cold stream flow path 318.

As shown, the core condenser 320 is arranged along both the core flow path 316 and the cold stream flow path 318 and the relatively cool air within the cold stream flow path 318 will contrast with the relatively hot air within the core flow path 316 with a delta temperature therebetween. The delta temperature, as referred to herein, may refer to a delta temperature at which heat exchange occurs between the core flow path and the cold stream flow path. Because the delta temperature between the core flow path 316 and the cold stream flow path 318 may be relatively small, to increase condensation of water from the core flow path 316 may require a very large surface area and thus result in a large condenser structure for the core condenser 320. In operation, as the water is condensed at the core condenser 320, the water may be collected into a water tank 322 (e.g., by means of a water separator, water collector, drainage paths, or the like). The collected water may then be pumped along a water line 324 by a water pump 326. It may be advantageous to convert liquid water to steam prior to injection back into the core flow path 316, and thus a core flow evaporator 328 may be arranged within or along the core flow path 316 downstream from the burner section 306. The liquid water from the water tank 322 may be passed through the core flow evaporator 328 where heat is picked up from the combustion byproducts produced in the burner section 306. The water will be evaporated to generate steam (and the temperature of the air in the core flow path 316 will decrease). This steam may then be injected into the burner section 306 and/or other location along the core flow path 316.

As shown, the core condenser 320 spans both the core flow path 316 and the cold stream flow path 318. Further, as noted, the core condenser 320 may require a large volume or surface area to achieve the desired condensation and water capture. This results in a pressure loss within the cold stream flow path 318 and can result in significant drag (e.g., 1,000 lb drag, or greater). This drag can result in significant inefficiencies of the operation of the engine 300. Accordingly, it may be advantageous to increase the delta temperature between the core flow and the bypass flow to achieve greater condensation efficiency within a condenser of the system. For example, in accordance with embodiments of the present disclosure, a delta temperature at which heat exchange occurs between a core flow path and a cold stream flow path may be maintained at at least 20° F., 50° F., 100° F. or greater. In some more specific example embodiments, it may be desirable to maintain the delta temperature at which heat exchange between the flows occurs at 50° F. or greater.

Figure 4:
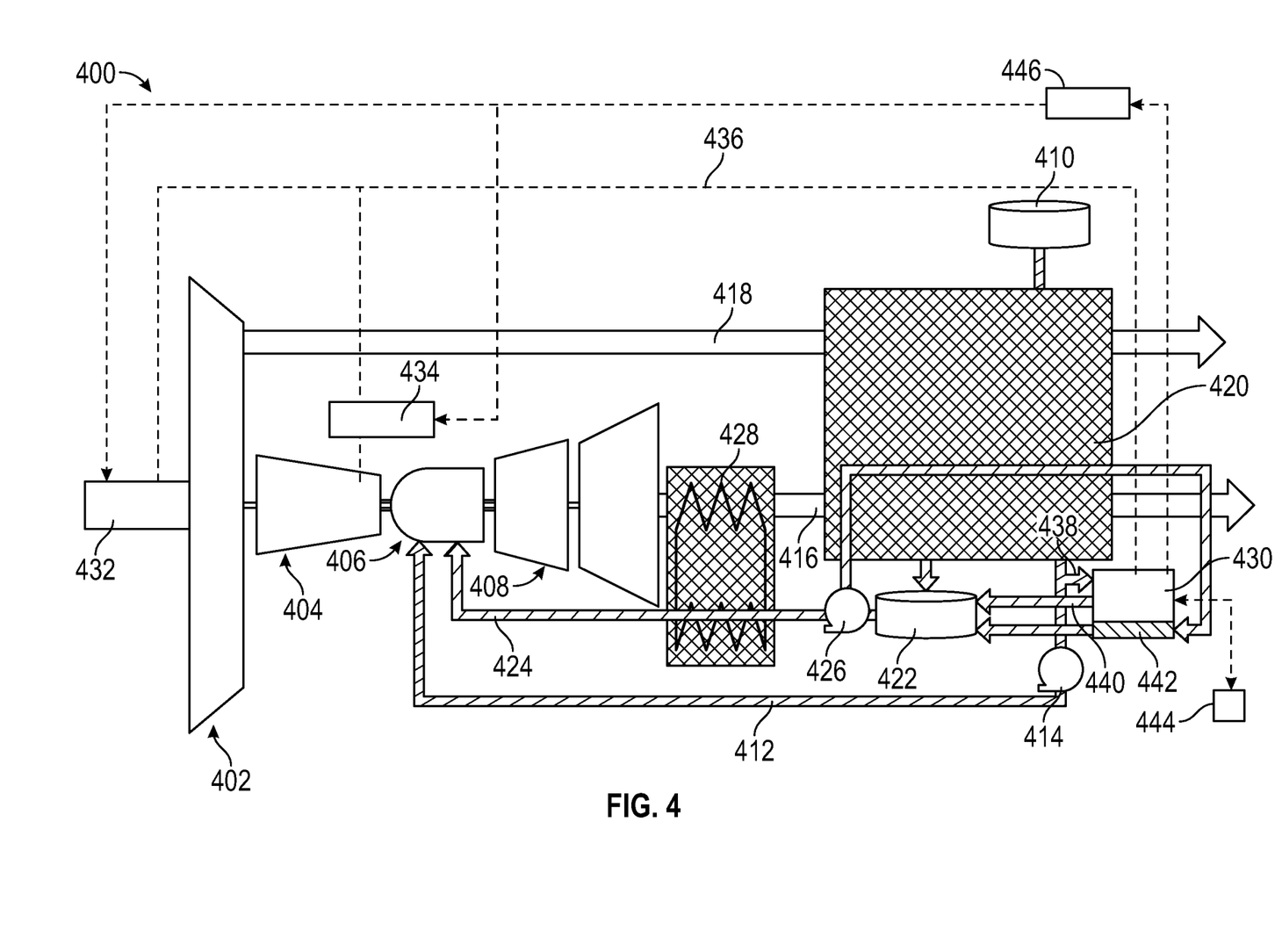
FIG. 4 is a schematic diagram of a turbine engine and fuel cell system in accordance with an embodiment of the present disclosure.

Referring now to FIG. 4, a schematic diagram of a hybrid electric-hydrogen combustion engine 400 in accordance with an embodiment of the present disclosure is shown. The hydrogen combustion engine 400 includes a fan section 402, a compressor section 404, a burner section 406, and a turbine section 408, similar to that described above with respect to FIG. 3. Hydrogen fuel for combustion within the burner section 406 is sourced from a cryogenic fuel tank 410. The fuel is passed through a fuel line 412 by operation of a pump 414 or the like. The fuel may be passed through various heat exchangers, pumps, or the like (not shown) along the fuel line 412. Such components may be used to alter a temperature and/or pressure of the fuel prior to injection into the burner section 406 for combustion.

Similar to the configuration of FIG. 3, a core flow path 416 passes through the engine 400 from an inlet at the fan section 402, through the compressor section 404, combusted within the burner section 406, and passed through the turbine section 408 to extract work therefrom. The hot exhaust that is expanded through the turbine section 408 is then directed downstream and exits through an exhaust nozzle (not shown). A second flow of air of the engine 400 is directed through a cold stream flow path 418 which bypasses the main core components of the engine 400 (e.g., a bypass flow of the engine 400).

A core condenser 420 is arranged along the core flow path 416 to condense water from the core flow path 416. In operation, as the water is condensed at the core condenser 420 and collected into a water tank 422 (e.g., by means of a water separator, water collector, drainage paths, or the like). The collected water may then be pumped along a water line 424 by a water pump 426 to be evaporated and/or injected into the core flow path 416 (e.g., at the compressor section 404, the burner section 406, and/or the turbine section 408). As shown, a core flow evaporator 428 is arranged within or along the core flow path 416 downstream from the burner section 406 to generate steam from the collected water.

In this configuration, the system includes a fuel cell 430 that is configured to generate electric power for use onboard the aircraft. The fuel cell 430 may be configured to provide electrical power to one or more motors and provide electrical power to other systems of the engine 400 and/or of the aircraft generally. For example, in this illustrative embodiment, the engine 400 includes a first motor 432 operably connected to the fan section 402 and a second motor 434 operably connected to the compressor section 404. The fuel cell 430 may be electrically connected to the motors 432, 434 through an electrical connection 436. The fuel cell 430 is configured to receive a portion of the hydrogen supplied from the cryogenic fuel tank 410. As illustratively shown, the fuel may be passed through the core condenser 420 prior to being supplied into the fuel cell 430. The fuel cell 430 will then react the fuel (e.g., hydrogen) therein, as will be appreciated by those of skill in the art, to generate electricity which can be supplied to the motors 432, 434 and/or to other electrical systems of the engine 400 and/or the aircraft.

The motors 432, 434 may be configured to be selectively controlled and operated, such as by an engine controller or the like. When operated, the motors 432, 434 may provide supplemental power to an engine shaft and/or the fan section 402 and/or the compressor section 404. The supplemental power may be used to continue to operate the engine 400 or maintain operation of the engine 400, particularly when using combustion of fuel may be inefficient, such as during idle. At idle, it may be difficult to generate water using the engine 400. For example, on hot days on the ground (e.g., at an airport), it may be difficult for the core condenser 420 to generate water. This is because as, at idle, the engine gas temperature is relatively high, but the exhaust water partial pressure decreases, which in turn causes an increase in condenser difficulty (e.g., see FIG. 6). The supply of electrical power from the fuel cell 430 to one or both of the motors 432, 434 allows for continued operation of the engine 400 (e.g., driving rotation of a fan, compressor, engine shaft, etc.).

In order for continued efficient operation, water generation is necessary. Because of the thermal, flow, and water content conditions of the core flow through the engine 400, generation of water from the exhaust flow may be difficult to maintain. Advantageously, the fuel cell 430 may be operated to generate water to maintain engine operation efficiency. For example, as shown, an input 438 to the fuel cell 430 may be a portion of the fuel sourced from the cryogenic fuel tank 410. The fuel is reacted within the fuel cell 430 to generate electrical power and a byproduct/output from the fuel cell 430 may be water. As such, an output 440 from the fuel cell 430 may be directed into the water tank 422, which can then be injected into the core flow 416 to increase a water content of the core flow 416.

It will be appreciated that the fuel cell 430 will generate heat during operation thereof. Typically, fuel cells will include a dedicated cooling scheme, such as a heat exchanger or the like, that provides cooling (or a cooling fluid) to the fuel cell. Such configurations are thus complex and/or add weight to the system (e.g., additional heat exchanger). However, as shown and in accordance with some embodiments of the present disclosure, the fuel cell 430 may be, at least partially, cooled by water of the system. In this configuration, a portion of the water of the system (e.g., stored in the water tank 422) may be directed to a cooling element 442 that is thermally connected to the fuel cell 430 and configured to provide cooling thereto. The cooling element 442, in some non-limiting embodiments, may be a cold plate or the like, that is attached or otherwise thermally connected to the fuel cell 430. The water operates as a working fluid of the cooling element 442 to operate as a heat sink to remove heat from the fuel cell 430. As shown, the water supplied to the cooling element 442 may be reintroduced into the water tank 422 and reused for fuel cell cooling and/or injection into the core flow 416. Even with the water being heated (heat pickup) by the fuel cell 430, it may be passed through the core condenser 420 to be cooled by the fuel sourced from the cryogenic fuel tank 410. The pumps 414, 426 may be used to ensure sufficient flow of both the fuel and the water during the operation of the fuel cell 430.

The water generated by the fuel cell 430, particularly during engine idle, may be used to cool the core flow evaporator 428 sufficiently even when the core condenser 420 is unable to condense water from the core flow 416. As such, even at idle, the combustor section 406 of the engine 400 may remain lit and power may be provided by the motors 432, 434. The control of the fuel cell 430 may be performed using a controller 444 or the like. The controller 444 may be an engine controller or other type of electrical or electronic controller configured to control operation of the fuel cell (and other components or systems of the engine and/or aircraft). The controller 444 may be in communication with other aircraft systems (e.g., FADEC) and/or sensors associated with the engine 400 and/or flight controls and operator input systems (e.g., pilot controls/input). The controller 444 may be operably connected to, and configured to control operation of, one or more aspects of the engine 400, such as controlling startup and shutdown of the engine and the like.

As noted, the fuel cell 430 may be used to power various components of the engine 400 (e.g., motors 432, 434) and/or to provide power to other aircraft or engine components that require electrical power. Further, in some embodiments, the system may include a power storage device 446 (e.g., a battery). The power storage device 446 may be charged from the fuel cell 430. The power storage device 446 may be used to power the motors 432, 434 or to provide power to other electrical and/or electronic components of the engine 400 or an associated aircraft. In some embodiments, the controller 444 may be configured to control and determine where electrical power from the fuel cell 430 is directed.

Figure 5:
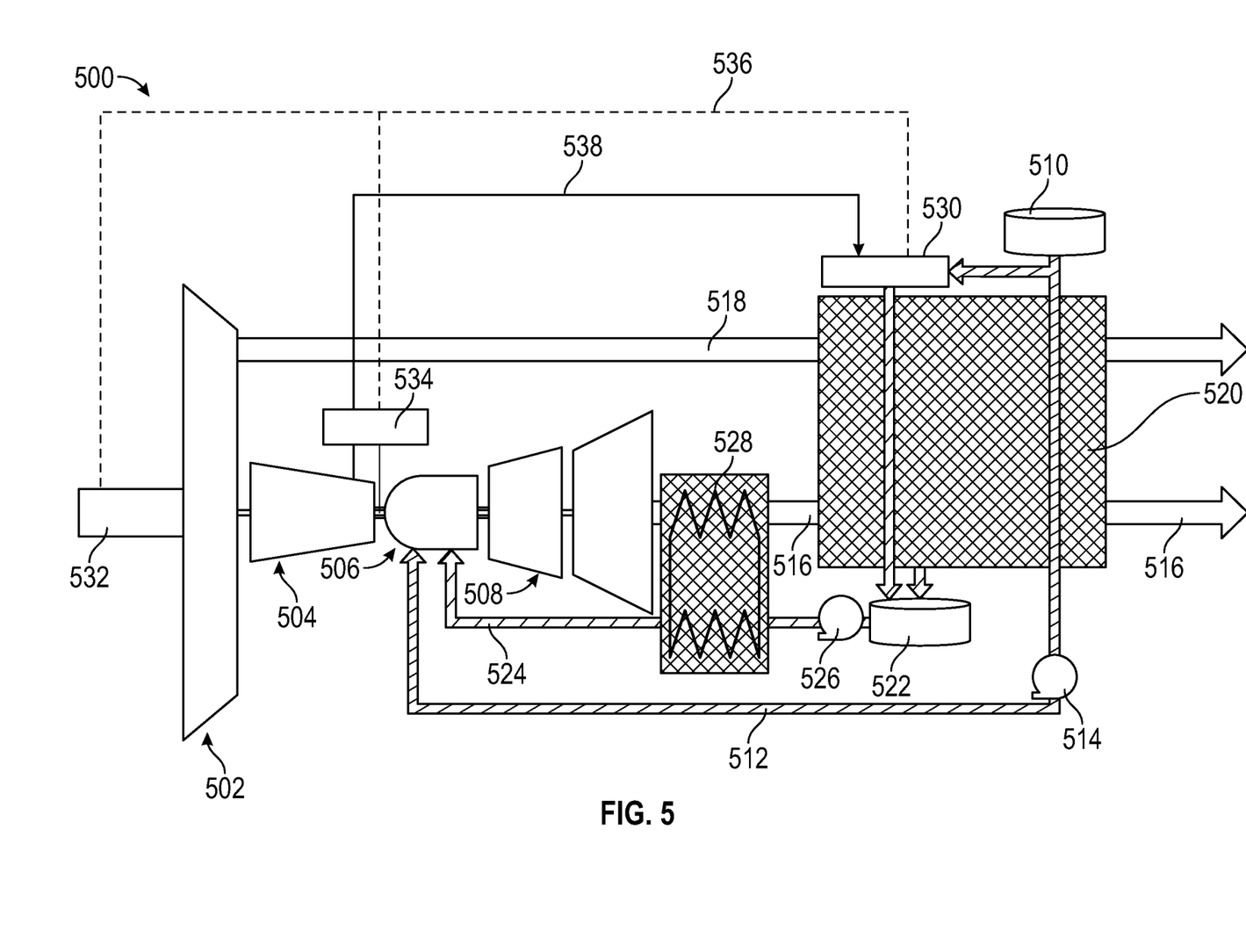
FIG. 5 is a schematic diagram of a turbine engine and fuel cell system in accordance with an embodiment of the present disclosure.

Turning now to FIG. 5, a schematic diagram of a hybrid electric-hydrogen combustion engine 500 in accordance with an embodiment of the present disclosure is shown. The hydrogen combustion engine 500 includes a fan section 502, a compressor section 504, a burner section 506, and a turbine section 508, similar to that described above. Hydrogen fuel for combustion within the burner section 506 is sourced from a cryogenic fuel tank 510. The fuel is passed through a fuel line 512 by operation of a pump 514 or the like. The fuel may be passed through various heat exchangers, pumps, or the like (not shown) along the fuel line 512. Such components may be used to alter a temperature and/or pressure of the fuel prior to injection into the burner section 506 for combustion. A core flow path 516 passes from the fan section 502, through the compressor section 504, the burner section 506, and the turbine section 508. A second flow of air of the engine 500 is directed through a cold stream flow path 518 which bypasses the main core components of the engine 500.

A core condenser 520 is arranged along the core flow path 516 to condense water from the core flow path 516. The water is collected into a water tank 522 and then pumped along a water line 524 by a water pump 526 to be evaporated and/or injected into the core flow path 516, as described above. As shown, a core flow evaporator 528 is arranged within or along the core flow path 516 downstream from the burner section 506 to generate steam from the collected water.

Similar to the embodiment of FIG. 4, the system includes a fuel cell 530. The fuel cell 530 is operably connected to a first electric motor 532 and a second electric motor 534, as shown and described above. The fuel cell 530 is configured to supply electrical power to the motors 532, 534 along an electrical connection 536. The fuel cell 530 is configured to receive a portion of the hydrogen supplied from the cryogenic fuel tank 510. In this embodiment, the fuel may be passed directly to the fuel cell 530, without passing through the core condenser 520. The fuel cell 530 will react the fuel (e.g., hydrogen) therein, as will be appreciated by those of skill in the art, to generate electricity which can be supplied to the motors 532, 534 and/or to other electrical systems of the engine 500 and/or the aircraft.

In this embodiment, the fuel cell 530 may be air-cooled, as compared to the water cooling of the embodiment of FIG. 4. The cool air supplied to the fuel cell 530 may be sourced from the cold stream flow path 518 which bypasses the main core components of the engine 500. As shown, a reactant flow path 538 may be provided to provide a reactant (e.g., pressurized air) for reaction with the fuel from the cryogenic fuel tank 510 to generate electrical power. In this case, the fuel cell 530 is thermally coupled to the core condenser 520. This coupling allows for cooling of the fuel cell 530 from the core condenser 520. This configuration may be simpler than the configuration of FIG. 4, in some respects, as there are fewer water flow paths.

Figure 6:
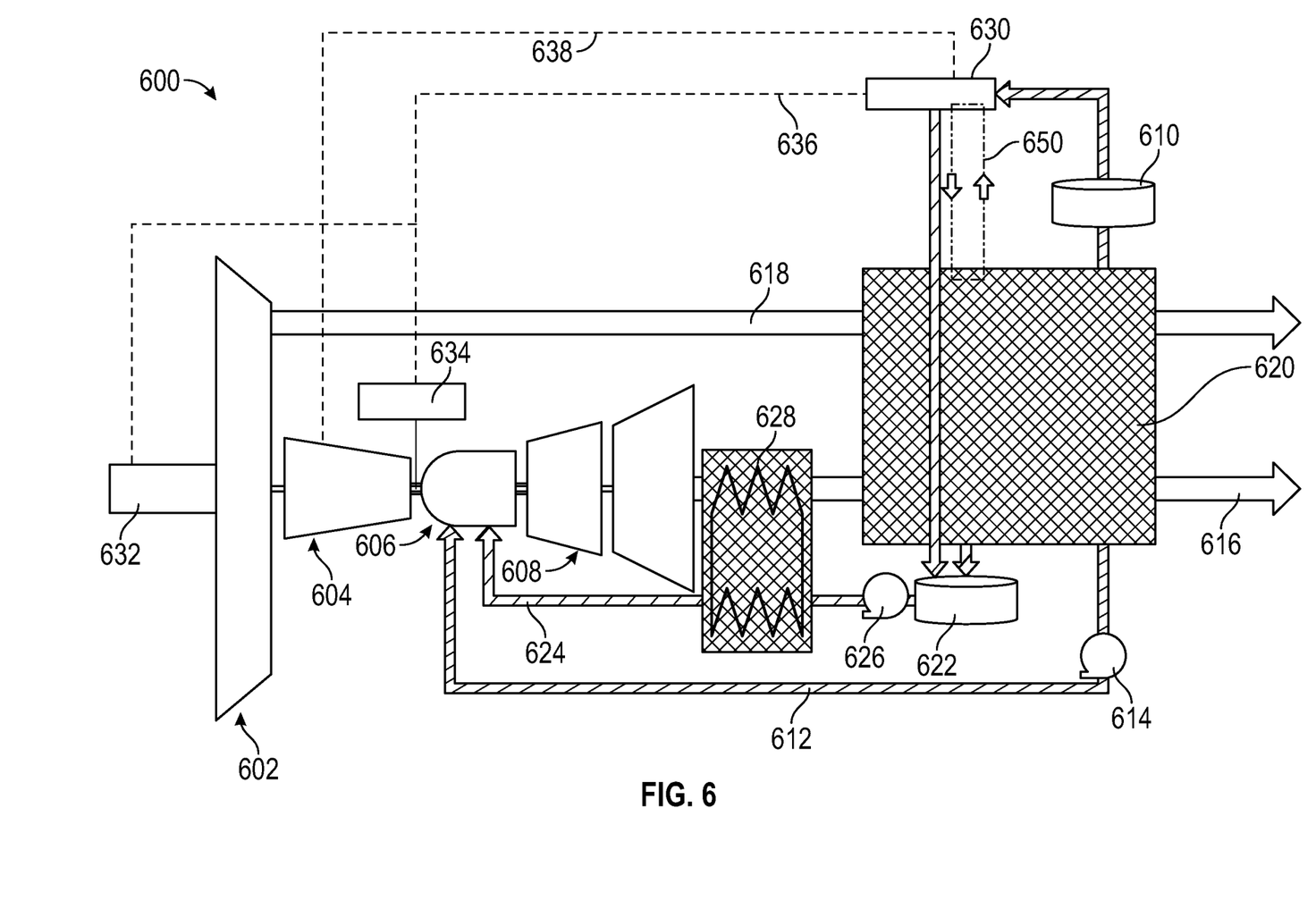
FIG. 6 is a schematic diagram of a turbine engine and fuel cell system in accordance with an embodiment of the present disclosure.

Turning now to FIG. 6, a schematic diagram of a hybrid electric-hydrogen combustion engine 600 in accordance with an embodiment of the present disclosure is shown. The hydrogen combustion engine 600 includes a fan section 602, a compressor section 604, a burner section 606, and a turbine section 608, similar to that described above. Hydrogen fuel for combustion within the burner section 606 is sourced from a cryogenic fuel tank 610. The fuel is passed through a fuel line 612 by operation of a pump 614 or the like. The fuel may be passed through various heat exchangers, pumps, or the like (not shown) along the fuel line 612. Such components may be used to alter a temperature and/or pressure of the fuel prior to injection into the burner section 606 for combustion. A core flow path 616 passes through the core assembly (e.g., fan section 602, compressor section 604, burner section 606, and turbine section 608). A second flow of air of the engine 600 is directed through a cold stream flow path 618 which bypasses the core assembly of the engine 600.

A core condenser 620 is arranged along the core flow path 616 to condense water from the core flow path 616. The water is collected into a water tank 622 and then pumped along a water line 624 by a water pump 626 to be evaporated and/or injected into the core flow path 616, as described above. As shown, a core flow evaporator 628 is arranged within or along the core flow path 616 downstream from the burner section 606 to generate steam from the collected water. Similar to the above described embodiments, the system includes a fuel cell 630. The fuel cell 630 is operably connected to electric motors 632, 634, as shown and described above. The fuel cell 630 is configured to supply electrical power to the motors 632, 634 along an electrical connection 636. The fuel cell 630 is configured to receive a portion of the hydrogen supplied from the cryogenic fuel tank 610 for the purpose of reacting with a reactant sourced along a reactant flow path 638 (e.g., from the compressor section 604). In this embodiment, the fuel may be passed directly to the fuel cell 630, without passing through the core condenser 620, although other types of heating may be employed, such as heat exchangers and/or other heat loads of the engine or aircraft, as described above. The fuel cell 630 will react the fuel (e.g., hydrogen) with the reactant (e.g., compressed air from compressor section 604) to generate electricity.

In this embodiment, the fuel cell 630 may be cooled using a closed-loop cooling system 650. The closed-loop cooling system 650 is configured to include a working fluid within a closed-loop cycle that performed heat pickup within the fuel cell 630 and dump the heat into or through the core condenser 620. This configuration is similar to that of FIG. 5, but physically moves the fuel cell 630 away from the core condenser 620, and allows for remote positioning thereof. An advantage of this system is the ability to locate the fuel cell 630 at a position remote from the core condenser 620 or even remote from the engine 600. For example, the fuel cell 630 may be housed in a wing or within a fuselage of an aircraft, such as within a cargo area or the like.

In each of the configurations of FIGS. 4-6, fuel from the cryogenic fuel sources is supplied to the fuel cell for the purpose of electrical power generation. Although schematically shown as a direct path of supply, those of skill in the art will appreciate that the fuel, being at cryogenic temperatures, may require heating before being supplied into the fuel cell. Such heating may be achieved through various heat exchanger and the like (e.g., as shown and described with respect to FIG. 2). That is, although schematically shown with a direct connection between the cryogenic fuel tanks and the fuel cells, these illustrations are merely schematic to reduce the complexity of the illustrations. The configurations described herein may be combined with features from one configuration (e.g., FIG. 2) being incorporated into other configurations (e.g., FIGS. 5-6). In accordance with some non-limiting embodiments, the heating of the fuel may be provided through aircraft loads, heat exchangers, environmental control systems, or other sources of heat (or waste heat), as described herein and variations thereon.

Figure 7:
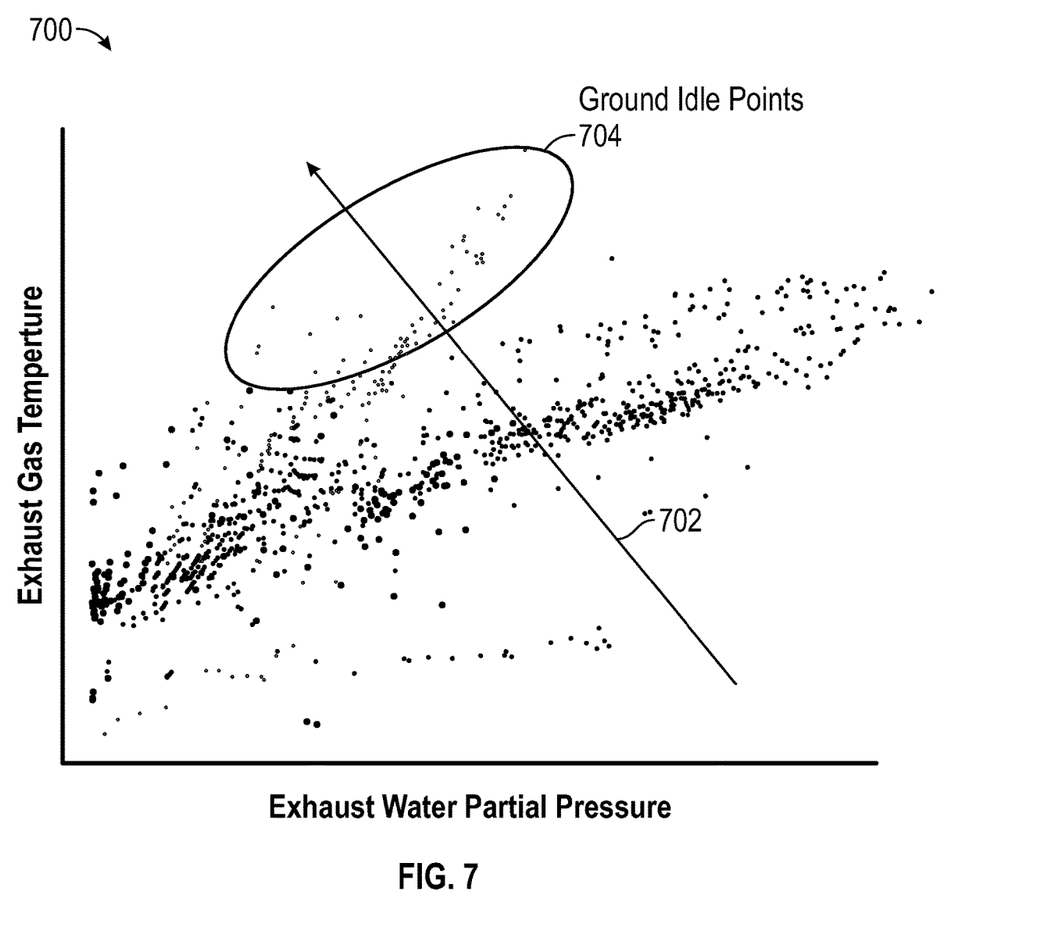
FIG. 7 is a schematic plot of engine efficiency related to water extraction from a core flow of the engine.

Turning to FIG. 7, a schematic plot 700 illustrating a plot of engine performance related to water generation. In plot 700, the horizontal (x) axis represents increasing exhaust water partial pressure and the vertical (y) axis represents exhaust gas temperature. Arrow 702 illustrated in plot 700 represents an increasing condenser difficulty in extracting water from and exhaust flow. As shown, as the exhaust water partial pressure decreases and the exhaust gas temperature increases, the efficiency of the condenser goes down as it becomes more difficult to extract or condense water from the flow. This is shown by the region 704, where ground idle points of engine operation are shown and indicative of the most difficult operational condition for water extraction.

Hot day ground idle is one of the most challenging points to generate water with a given condenser design. Combustor cooling and engine nozzle designs may benefit from requiring steam within the core flow. Hot day ground idle is also the point most likely to limit evaporator design, especially without water availability, which has the highest exhaust gas temperature, as shown in FIG. 7. Furthermore, fuel cells may require sub-saturation temperature cooling, for efficient operation thereof. It is not desirable to add another heat exchanger or increase a heat exchanger size to add more thermal capacity capability. Advantageously, embodiments of the present disclosure address these issues by integrating a fuel cell into the engine and using the cryogenic fuel and core condenser to provide fuel and cooling to the fuel cell. The fuel cell, in turn, provides supplemental power and water to the engine, particularly during conditions such as idle, where water may be otherwise difficult to generate.

In operation, embodiments of the present disclosure can provide various functionality. For example, e-taxi may be one aircraft operation that benefits from systems described herein. During e-taxi, a fuel cell can provide power to a low spool motor, aircraft power systems/requirements, and pumps, and can provide generated water to storage for later use, or excess water may be stored elsewhere or dumped overboard. The fuel cell may be cooled by a water circuit using the core condenser to reject heat or air cooling may be employed, as described above. As such, higher efficiency taxiing may be achieved as compared to engines and aircraft without such systems.

Another operational state that may benefit from systems described herein is startup. At startup of the engine, the fuel cell can power a motor for high spool rotation, engine actuation, and pumps, and can provide water to storage, and may be cooled by condenser water circuit. It will be appreciated that at startup there is no heat source for evaporation yet.

During ground idle and/or descent, combustion is active in the combustor, but minimal power is generated. In such configuration, a low spool of the engine may be powered or driving by a motor powered by the fuel cell. The fuel cell may also provide power to the high spool for operability. Furthermore, the fuel cell can provide water, as needed, for core evaporator operation, steam generation for combustor, or the like. As such, engine designs that require water may be achieved without requiring large water storage or precharge (i.e., fuel cell water generation supplements water supply requirements for engine operation).

In accordance with some embodiments, fuel cell heat may be rejected to the condenser via a water loop (e.g., FIG. 4) or through a direct cold plate (e.g., FIG. 5). During some operational conditions (e.g., idle), the condenser may not produce water, so water cooling does not add to design heat flux of the condenser. In some embodiments, water in the fuel cell cooling loop (e.g., FIG. 4) may be at higher pressure than a partial pressure of water in the exhaust. As such, the water of the cooling loop of the fuel cell can be cooled as a liquid even while the fan air temperature is too high to condense water from exhaust (e.g., cold stream flow path 418, 518).

During takeoff and/or approach, water reserves may be used with the fuel cell and gas turbine both at high power. At cruise, the primary power source is derived from the gas generator (i.e., the engine 400) and not the fuel cell. Actuation and pumps can be powered by mechanical actuators, generators, or fuel cell (e.g., supplying supplemental power). At cruise, water reserves can be replenished with mission level optimization.

As will be understood, in view of the above, different operational modes of the turbine engine may employ different water generation and/or power generation mechanisms, that are possible through the systems described herein. For example, in a first operational mode, the systems may be configured to primarily generate water through the combustion process and the output from the burner section. The first operational mode may be climb, cruise, or the like, where the power output from the engine is high. In contrast, in a second operational mode, the engine output may not be high, such as during descent, idle, taxi, and the like. In these operational modes, the system may transition to having the water and/or power primarily provided from the fuel cell, as described above.

For example, in one non-limiting example, the system may be operated or controlled to generate 50% or greater (e.g., up to 100%) of the water collected and/or used by the system from the core flow passing through the core condenser during a high power operation of the engine. This can be transitioned to fuel cell sourced water to generate 50% or greater (e.g., up to 100%) of the collected water during a low power operation of the engine. In these configurations, the high/low power of the engine (or core assembly) refers to a percentage of maximum corrected thrust for the particular engine and for a particular flight condition. For example, high power operation may be defined as 50% or greater of maximum corrected thrust for a given flight operation and low power operation may be defined as below 50% of maximum corrected thrust for a given flight operation. Under such definition, flight conditions of high power include take-off and climb and low power flight conditions include descent, idle, taxi, and the like. It will be appreciated that the term "flight conditions" is inclusive of all operations of an aircraft, including when on the ground, such as when the aircraft is on the ground and operating at least one engine or equivalent (e.g., auxiliary power unit ("APU")). That is, any time an engine (e.g., power generating) or APU (e.g., non-power generating or other engine) is operating on the ground, it may be considered a "flight condition" of the aircraft (i.e., being "in flight" is not required). The span of water generation and/or cooling or the like may be from full core assembly operation (e.g., fuel cell off) to full fuel cell operation (e.g., engine off or full idle). However, the system is not configured as a binary one or the other, and the water generation/cooling may be some combination from both the core condenser and the fuel cell.

In some embodiments, the transition from core condenser generation to fuel cell may be based on other parameters or metrics. For example, in some embodiments, the control operation may be based on throttle position (e.g., commanded thrust from a pilot). In the full open position of the throttle, all or nearly all water may be generated (e.g., up to 100%) through operation of the core condenser (and the fuel cell may be off or minimally operating). In this case, the engine operation (e.g., power generation) may be sufficient for flight and also onboard power generation or the like. In the closed position, less air passes through the engine, and thus the fuel cell may take over water generation capacity (e.g., up to 100%). In some configurations, the throttle lever angle (TLA) may be used to determine the preference of core condenser or fuel cell. Higher TLA is used for greater engine thrust and lower TLA is lower engine thrust, with higher TLA causing preference to core condenser and lower TLA causing preference to fuel cell. In one non-limiting example, if the throttle is positioned at 50% of ranger or greater (with 100% or Full being 100% commanded power), the preference is to core condenser whereas if the throttle is positioned at below 50% (e.g., idle states of the engine), then preference is given to the fuel cell. It will be appreciated that between 0% (full fuel cell operation) and 100% (full engine operation), there may be a mix of both engine (core condenser) and fuel cell operation, with a majority of water generation being sourced from one or the other for most of the range, although an even split is possible without departing from the scope of the present disclosure.

Advantageously, in accordance with embodiments of the present disclosure, improved condensation of water from a core flow of a turbine engine is provided. The improved condensation is achieved through use of a fuel cell operably connected to the engine, and directing both fuel and water of the engine through the fuel cell. This is particularly advantageous at engine idle, where it is difficult to condense water from a core flow at high temperature but low water partial pressure at the exhaust. Further, the fuel cell cooling in such systems may be achieved through use of the core condenser of the engine system, thus dual-purposing such condenser as a heat exchanger for water extraction from a core flow and also provide a cooling mechanism for the fuel cell.

As used herein, the terms "about" and "substantially" are intended to include the degree of error associated with measurement of the particular quantity based upon the equipment available at the time of filing the application. For example, "about" or "substantially" may include a range of ±8%, or 5%, or 2% of a given value or other percentage change as will be appreciated by those of skill in the art for the particular measurement and/or dimensions referred to herein. The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A turbine engine system, comprising:
  a core assembly comprising a compressor section, a burner section, and a turbine section arranged along a shaft, with a core flow path through the core assembly such that exhaust from the burner section passes through the turbine section and exits through a nozzle;
  a core condenser arranged downstream of the turbine section of the core assembly along the core flow path and upstream of the nozzle, the core condenser configured to condense water from the core flow path;

a fuel cell operably connected to the core assembly;

a fuel source configured to supply a fuel to each of the burner section for combustion and the fuel cell for reaction to generate electricity;

at least one electric motor operably coupled to the core assembly and configured to impart power to a portion of the core assembly, wherein the fuel cell is configured to supply electrical power to the at least one electric motor; and a controller configured to operate the fuel cell when the core assembly is at a low power setting and to disengage the fuel cell when the core assembly is at a high power setting, wherein a portion of the water condensed from the core condenser is directed through a cooling element of the fuel cell to provide cooling thereto based on operation thereof.

2. The turbine engine system of claim 1, wherein the cooling element is a cold plate thermally coupled to the fuel cell.

3. The turbine engine system of claim 1, wherein the fuel cell is thermally coupled to the core condenser.

4. The turbine engine system of claim 3, wherein the thermal coupling of the fuel cell to the core condenser comprises one of:

mounting at least a portion of the fuel cell to the core condenser;

a closed-loop cooling cycle thermally connecting the fuel cell to the core condenser; or directing the water through the core condenser and into the cooling element of the fuel cell.

5. The turbine engine system of claim 1, wherein compressed air is directed from the compressor section to the fuel cell to provide at least one of air cooling or reactant air to the fuel cell.

6. The turbine engine system of claim 1, wherein the at least one electric motor is operably coupled to at least one of the compressor section or the shaft of the core assembly to provide power thereto.

7. The turbine engine system of claim 1, further comprising a fan section at an inlet of the core assembly.

8. The turbine engine system of claim 7, wherein the at least one electric motor is operably coupled to the fan section to provide power thereto.

9. The turbine engine system of claim 1, wherein each of the core condenser and the fuel cell are configured to output water to be injected into the core flow path.

10. The turbine engine system of claim 9, further comprising a water tank configured to receive the output water from the core condenser and the fuel cell.

11. The turbine engine system of claim 1, further comprising a core flow evaporator arranged downstream from the turbine section and upstream from the core condenser along the core flow path, the core flow evaporator configured to generate steam from water output from at least one of the core condenser and the fuel cell.

12. The turbine engine system of claim 1, wherein the controller is configured to control operation of the fuel cell when the core assembly is in an idle mode of operation.

13. The turbine engine system of claim 1, wherein water output from the core condenser, the fuel cell, and the cooling element are collected in a water tank.

14. The turbine engine system of claim 13, wherein the portion of water directed through the cooling element is sourced from the water tank.

15. The turbine engine system of claim 14, wherein the water sourced from the water tank and supplied to the cooling element is passed through the core condenser.

16. The turbine engine system of claim 13, further comprising a core flow evaporator arranged downstream from the turbine section and upstream from the core condenser along the core flow path, the core flow evaporator configured to generate steam from water sourced from the water tank.

17. The turbine engine system of claim 13, further comprising a water pump arranged to pump water from the water tank to at least one of the burner section and the cooling element.

18. A turbine engine system, comprising:

a core assembly comprising a compressor section, a burner section, and a turbine section arranged along a shaft, with a core flow path through the core assembly such that exhaust from the burner section passes through the turbine section and exits through a nozzle;

a core condenser arranged downstream of the turbine section of the core assembly along the core flow path and upstream of the nozzle, the core condenser configured to condense water from the core flow path;

a fuel cell operably connected to the core assembly;

a fuel source configured to supply a fuel through a fuel line to each of the burner section for combustion and the fuel cell for reaction to generate electricity, wherein the fuel line extends through the core condenser at an upstream location relative to the burner section and the fuel cell along the fuel line; and at least one electric motor operably coupled to the core assembly and configured to impart power to a portion of the core assembly, wherein the fuel cell is configured to supply electrical power to the at least one electric motor.

19. The turbine engine system of claim 18, further comprising a fuel pump arranged along the fuel line at a location downstream relative to the fuel cell and upstream relative to the burner section.

\* \* \* \* \*